(12) United States Patent
Wilber

(10) Patent No.: US 10,301,948 B2
(45) Date of Patent: May 28, 2019

(54) FAN BLADE DAMPING DEVICE

(71) Applicant: UNITED TECHNOLOGIES CORPORATION, Farmington, CT (US)

(72) Inventor: John E. Wilber, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 511 days.

(21) Appl. No.: 14/768,586

(22) PCT Filed: Dec. 16, 2013

(86) PCT No.: PCT/US2013/075296
§ 371 (c)(1),
(2) Date: Aug. 18, 2015

(87) PCT Pub. No.: WO2014/158254
PCT Pub. Date: Oct. 2, 2014

(65) Prior Publication Data
US 2016/0024940 A1    Jan. 28, 2016

Related U.S. Application Data

(60) Provisional application No. 61/783,111, filed on Mar. 14, 2013.

(51) Int. Cl.
| F01D 5/14 | (2006.01) |
| F01D 5/16 | (2006.01) |
| F01D 5/18 | (2006.01) |
| F01D 5/26 | (2006.01) |

(Continued)

(52) U.S. Cl.
CPC .............. *F01D 5/26* (2013.01); *F01D 5/147* (2013.01); *F01D 5/16* (2013.01); *F01D 5/18* (2013.01);

(Continued)

(58) Field of Classification Search
CPC ...... F16F 3/12; F01D 5/16; F01D 5/26; F01D 5/147; F01D 5/18; F01D 5/282;
(Continued)

(56) References Cited

U.S. PATENT DOCUMENTS 2,689,107 A * 9/1954 Odegaard ................ F01D 5/16
416/229 R
5,356,264 A * 10/1994 Watson .................... F01D 25/04
415/119

(Continued)

FOREIGN PATENT DOCUMENTS

| EP | 0926312 A2 | 6/1999 |
| EP | 1253290 A2 | 10/2002 |
| JP | WO 2012086400 A1 * | 6/2012 ............... F01D 5/16 |

OTHER PUBLICATIONS

European Search Report for Application No. EP 13 88 0327.
International Search Report Application No. PCT/US2013/075296 reported on Apr. 11, 2014.

*Primary Examiner* — Mark A Laurenzi
*Assistant Examiner* — Xiaoting Hu
(74) *Attorney, Agent, or Firm* — Cantor Colburn LLP

(57) ABSTRACT

An airfoil for a gas turbine engine and method of manufacture of the airfoil are disclosed. The airfoil may comprise a first side extending axially from a leading edge to a trailing edge and extending radially from a base to a tip, a second side opposite to the first side, a pocket disposed in the first side, a filler disposed in the pocket, and a preloaded spring disposed within the filler.

17 Claims, 8 Drawing Sheets

(51) Int. Cl.
*F01D 5/28* (2006.01)
*F16F 3/12* (2006.01)

(52) U.S. Cl.
CPC ............... *F01D 5/282* (2013.01); *F16F 3/12* (2013.01); *F05D 2220/32* (2013.01); *F05D 2230/23* (2013.01); *F05D 2230/40* (2013.01); *F05D 2230/60* (2013.01); *F05D 2240/30* (2013.01); *F05D 2260/941* (2013.01); *F05D 2260/96* (2013.01); *Y02T 50/671* (2013.01); *Y02T 50/673* (2013.01)

(58) Field of Classification Search
CPC .......... F05D 2260/941; F05D 2260/96; F05D 2230/23; F05D 2230/60; Y02T 50/671
See application file for complete search history.

(56) References Cited

U.S. PATENT DOCUMENTS

| | | | | |
|---|---|---|---|---|
| 5,407,321 | A * | 4/1995 | Rimkunas | F01D 5/16 415/115 |
| 5,498,137 | A * | 3/1996 | El-Aini | F01D 5/16 416/144 |
| 6,039,542 | A * | 3/2000 | Schilling | F01D 5/16 416/224 |
| 6,471,484 | B1 * | 10/2002 | Crall | F01D 5/16 416/229 A |
| 8,500,410 | B2 * | 8/2013 | De Moura | F01D 5/16 416/229 A |
| 9,488,066 | B2 * | 11/2016 | Yamashita | F01D 5/16 |
| 2005/0047918 | A1 * | 3/2005 | Powell | F01D 5/16 416/233 |
| 2008/0273983 | A1 * | 11/2008 | Clark | F01D 5/147 416/223 A |
| 2009/0016894 | A1 * | 1/2009 | Strother | B21D 26/055 416/241 R |
| 2009/0056126 | A1 * | 3/2009 | Chivers | F01D 5/147 29/889.2 |
| 2009/0057488 | A1 | 3/2009 | Goldfinch et al. | |
| 2010/0189933 | A1 | 7/2010 | Strother | |
| 2010/0329847 | A1 * | 12/2010 | Yamashita | F01D 5/16 415/115 |
| 2011/0081249 | A1 * | 4/2011 | Read | F01D 5/147 416/233 |
| 2011/0174938 | A1 * | 7/2011 | Calderon | F16M 11/105 248/125.7 |

\* cited by examiner

FAN BLADE DAMPING DEVICE

CROSS-REFERENCE TO RELATED APPLICATION

This patent application is a US National Stage under 35 U.S.C. § 371, claiming priority to International Application No. PCT/US2013/075296 filed on Dec. 16, 2013, which claims priority under 35 U.S.C. § 119(e) to U.S. Patent Application Ser. No. 61/783,111 filed on Mar. 14, 2013.

FIELD OF THE DISCLOSURE

The present disclosure relates generally to gas turbine engines and, more particularly, to fan blades in a gas turbine engine.

BACKGROUND OF THE DISCLOSURE

Gas turbine engines may typically include a fan, a compressor, a combustor, and a turbine, with an annular flow path extending axially through each. Initially, the fan, which is powered by the turbine, draws ambient air into the engine. Part of the air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate. The other part of the airflow from the fan is used to generate forward thrust.

Various components of the gas turbine engine, such as fan, compressor, and turbine airfoils, are subject to centrifugal force, aerodynamic force, tensile and vibratory stress fields due to the high rotational speeds of the gas turbine engine rotors. In addition, since airfoils are cantilevered from the rotor, the airfoils may bend or flex in various directions, experiencing side-to-side, tip, and torsional flutter. Thus, flutter and excitation of the airfoils at resonant frequencies may cause airfoil damage, such as cracking, or failure, such as from low cycle fatigue (LCF) and high cycle fatigue (HCF).

Currently, airfoil design has included hollow airfoils or airfoils having a plurality of pockets in order to reduce the airfoil mass and weight, thereby increasing rotor speed and fuel performance. The hollow airfoils or airfoil pockets may be filled with an elastomeric material for damping. However, the elastomeric material does not resist side-to-side, tip, and torsional flutter or movement of the airfoil. Accordingly, there exists a need for an improved damping device.

SUMMARY OF THE DISCLOSURE

According to one exemplary embodiment of the present disclosure, an airfoil for a gas turbine engine is disclosed. The airfoil may comprise a first side extending axially from a leading edge to a trailing edge and extending radially from a base to a tip, a second side opposite to the first side, a pocket disposed in the first side, a filler disposed in the pocket, and a preloaded spring disposed within the filler.

In a refinement, the preloaded spring may exert a force within the pocket for resisting flutter of the airfoil and for damping vibratory response of the airfoil.

In another refinement, the filler may surround and encapsulate the preloaded spring, and may be formed to fill the pocket.

In a related refinement, the filler may dampen a vibratory response of the airfoil, prevent decompression of the preloaded spring, impart force exerted from the preloaded spring to the airfoil, and prevent contact of the preloaded spring with the pocket.

In another refinement, the filler may be bonded to the pocket of the first side, and the second side may be bonded to the first side and the filler.

In another refinement, the preloaded spring and the filler may be configured to change an inherent frequency of the airfoil to a predetermined frequency outside a range of resonant frequencies of the airfoil.

In related refinement, at least one of a composition of the filler, thickness of the filler, durometer of the filler, thickness of the preloaded spring, preload of the preloaded spring, stiffness of the preloaded spring, and heat treatment of the preloaded spring may be configured to change the inherent frequency of the fan blade to the predetermined frequency.

In another refinement, the preloaded spring may include at least one gusset for increasing stiffness of the preloaded spring.

In a related refinement, at least one of a width, depth, radii, thickness, and heat treatment of the at least one gusset may be configured to change the inherent frequency of the airfoil to a predetermined frequency outside a range of resonant frequencies of the airfoil.

In another refinement, the preloaded spring may include at least one hole to allow attachment of the filler to the preloaded spring.

In another refinement, the preloaded spring may be composed of a sheet of spring steel having an outline similar to an outline of the pocket.

In another refinement, the filler may be composed of an elastomeric material.

According to another exemplary embodiment of the present disclosure, a method for manufacturing an airfoil of a gas turbine engine is disclosed. The method may comprise providing a spring with a predetermined load, embedding the spring within a filler, bonding the filler to a cavity of a first side of the airfoil, and bonding a second side of the airfoil to the filler and the first side of the airfoil.

In a refinement, the method may further comprise configuring at least one of the predetermined load of the spring, thickness of the spring, stiffness of the spring, heat treatment of the spring, composition of the filler, thickness of the filler, and durometer of the filler, to dampen a frequency of the airfoil and reduce risk of high and low cycle fatigue.

In another refinement, the method may further comprise forming at least one gusset in the spring.

In another refinement, the method may further comprise molding the filler to fill the cavity of the first side of the airfoil.

In another refinement, the method may further comprise cutting a contour of the spring from a sheet of spring steel to correspond to a contour of the cavity.

In another refinement, the method may further comprise providing holes in the spring to allow molding of the filler therethrough.

According to yet another exemplary embodiment of the present disclosure, a damper for an airfoil having at least one internal cavity is disclosed. The damper may comprise a spring, and a layer of elastomeric material surrounding the spring.

In a refinement, the spring may have a predetermined load for exerting a force within the at least one internal cavity, changing an inherent frequency of the airfoil and resisting side-to-side and torsional movement of the airfoil.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

Figure 1:
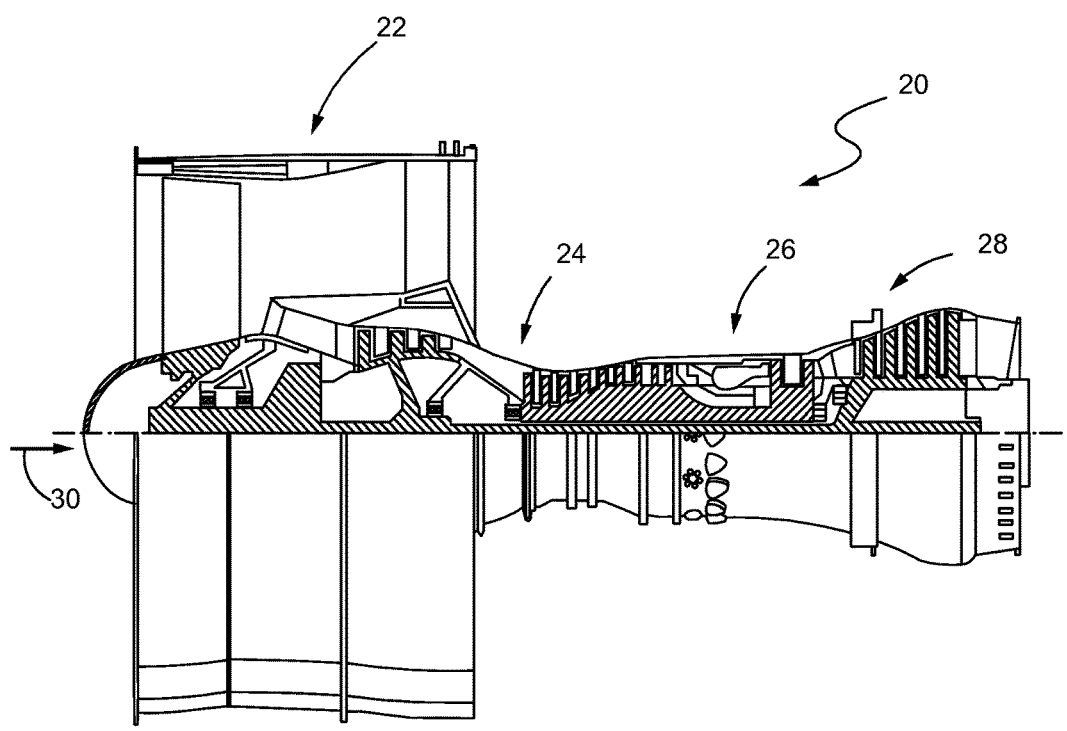
FIG. 1 is a cross-sectional view of a gas turbine engine, according to an exemplary embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a fan section 22 which draws ambient air into the engine 20, a compressor section 24 where air is pressurized, a combustor 26 downstream of the compressor section which mixes and ignites the compressed air with fuel and thereby generates hot combustion gases, a turbine section 28 downstream of the combustor 26 for extracting power from the hot combustion gases, and an annular flow path 30 extending axially through each. Gas turbine engine 20 may be used on an aircraft for generating thrust or power, or in land-based operations for generating power as well.

Figure 2:
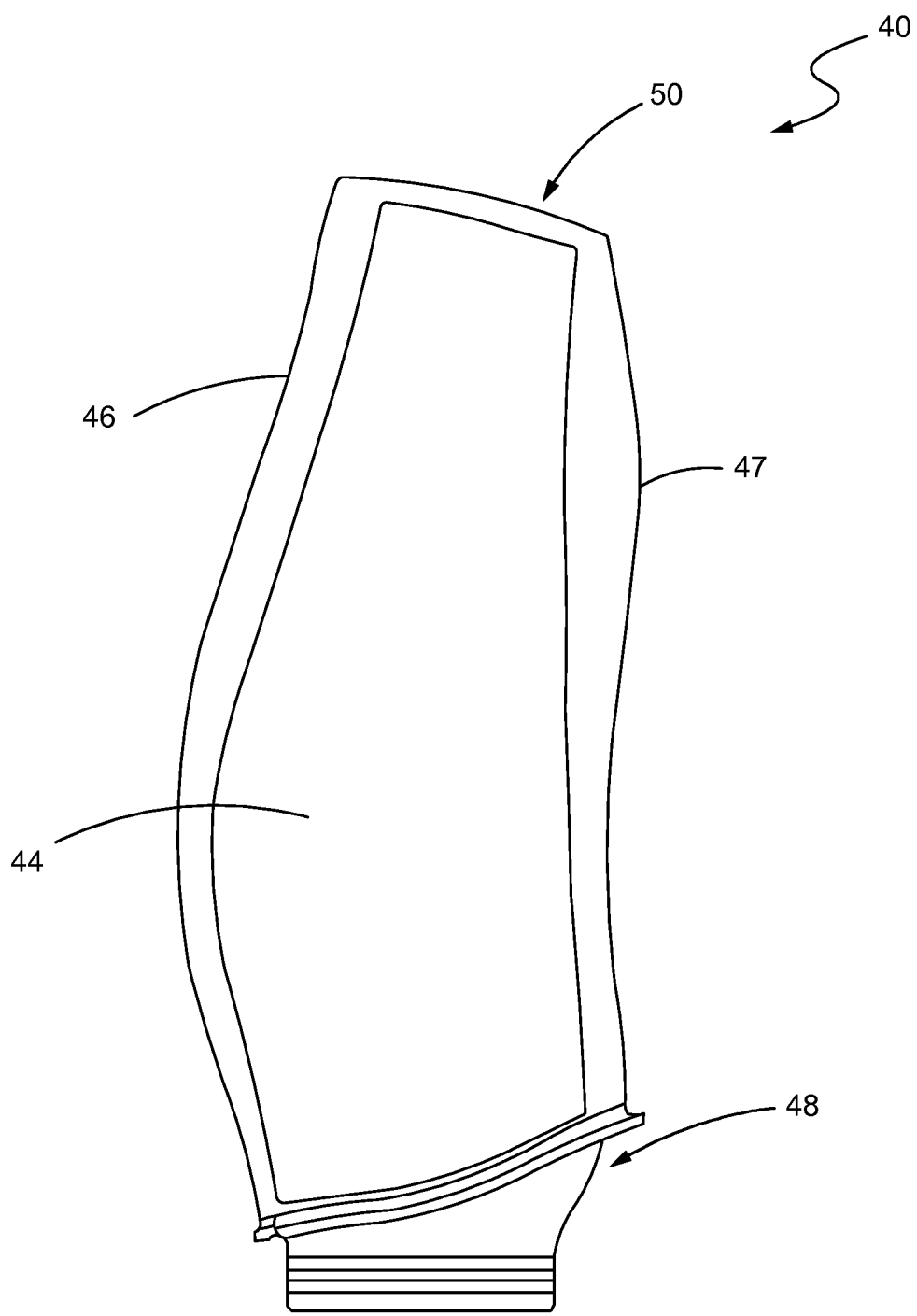
FIG. 2 is a side view of an airfoil in the gas turbine engine of FIG. 1.
Figure 4:
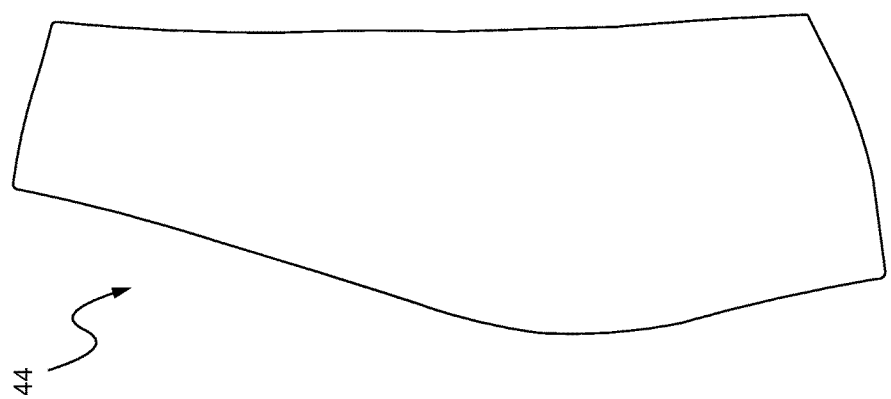
FIG. 4 is a side view of a second side of the airfoil of FIG. 2
Figure 3:
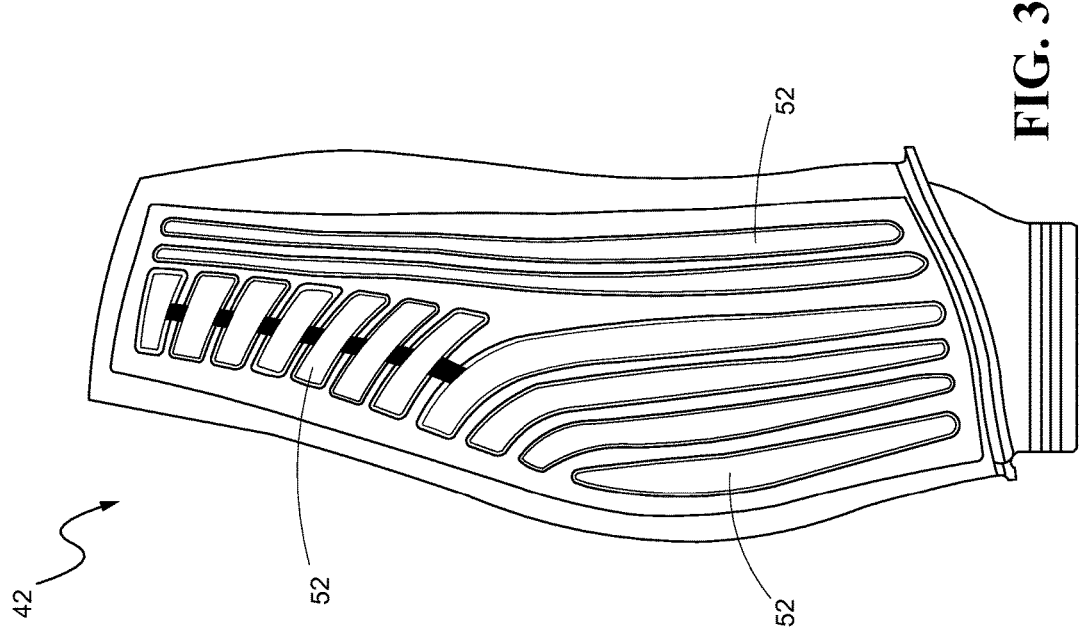
FIG. 3 is a side view of a first side of the airfoil of FIG. 2.
Figure 5:
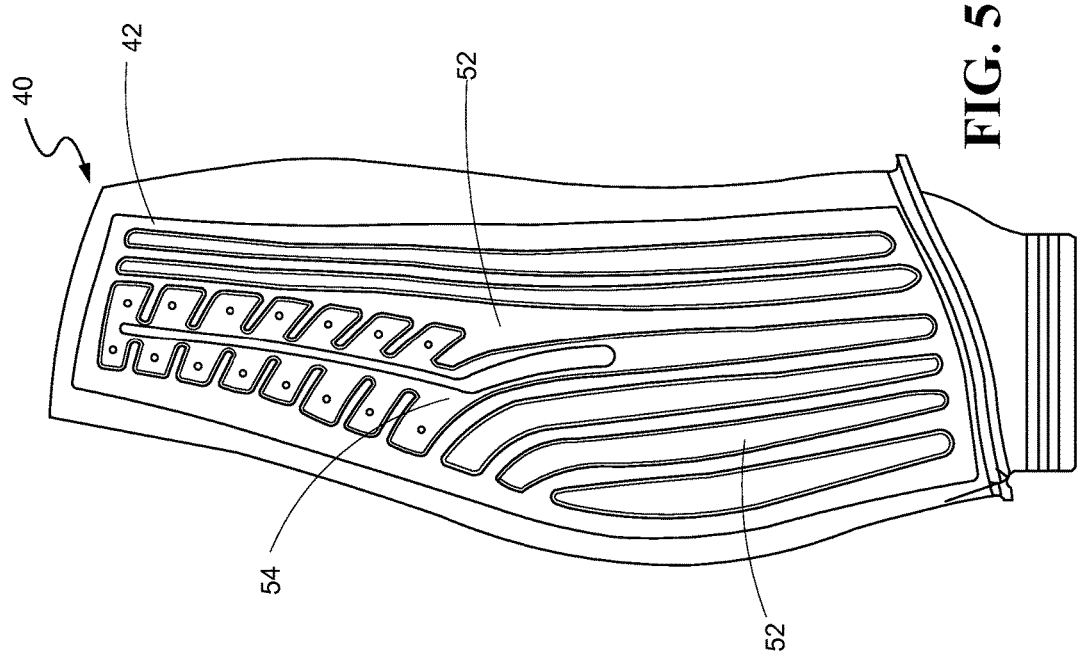
FIG. 5 is a side view of the first side of FIG. 3 including a filler.

Turning now to FIGS. 2-4, an airfoil 40 of the gas turbine engine 20 is shown. The airfoil 40 may comprise a fan blade in the fan section 22, or a rotor blade or stator vane in the compressor section 24 or turbine section 28 of the gas turbine engine 20. Airfoil 40 may project radially from an endwall of a rotor in the engine 20. The airfoil 40 may comprise a first side 42 and an opposite second side 44 extending axially from a leading edge 46 to a trailing edge 47 (downstream of the leading edge 46) and extending radially from a base 48 to a tip 50. The airfoil 40 may be composed of aluminum metal, although other suitable materials are certainly possible.

At least one internal cavity or pocket 52 may be disposed in the first side 42 of the airfoil 40. As shown best in FIG. 3, some pockets 52 may extend substantially longitudinally, some pockets 52 may extend substantially laterally, and some pockets 52 may extend both longitudinally and laterally. Each pocket 52 may be decided and defined by ridges therebetween. It is to be understood that the pockets 52 depicted in FIG. 3 are only exemplary, and any number of different configurations and number of pockets are certainly possible.

Referring now to FIGS. 5-8, a filler 54 may be disposed in one or more of the pockets 52. The filler 54 may be used to dampen an inherent frequency of the airfoil 40. Although shown as having only one filler 54 in FIG. 5, it is to be understood that multiple fillers 54 may certainly be used in the airfoil 40. The filler 54 may fill one or more of the pockets 52 and may be shaped to a contour of the pocket(s) 52. It is to be understood that the shape of the filler 54 and contour of the pockets 52, in FIGS. 2-8, are merely exemplary. Other shapes, contours, and designs for the pockets and filler(s) are certainly possible.

Figure 8:
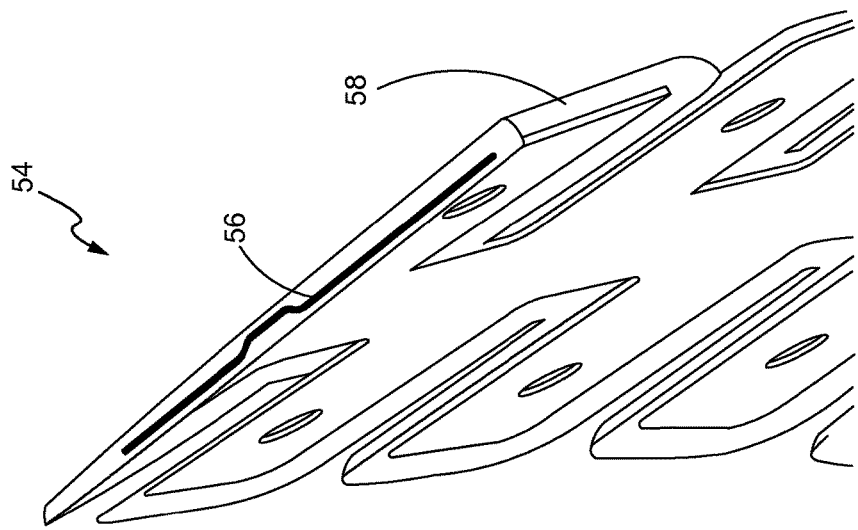
FIG. 8 is a perspective view of a cross-section of the filler of FIG. 6 along line 8-8 of FIG. 6.
Figure 7:
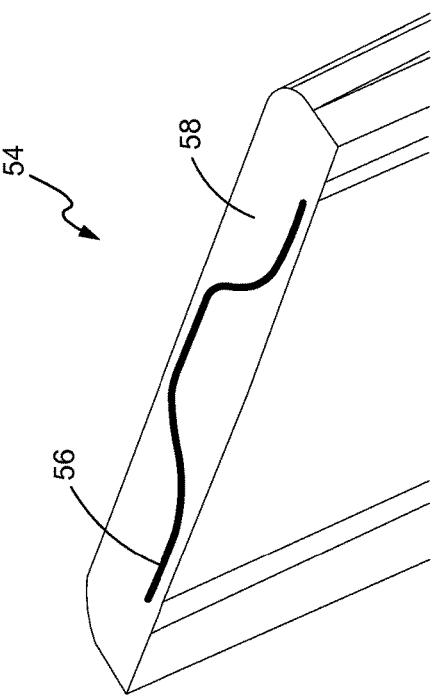
FIG. 7 is a perspective view of a cross-section of the filler of FIG. 6 taken along line 7-7 of FIG. 6.
Figure 6:
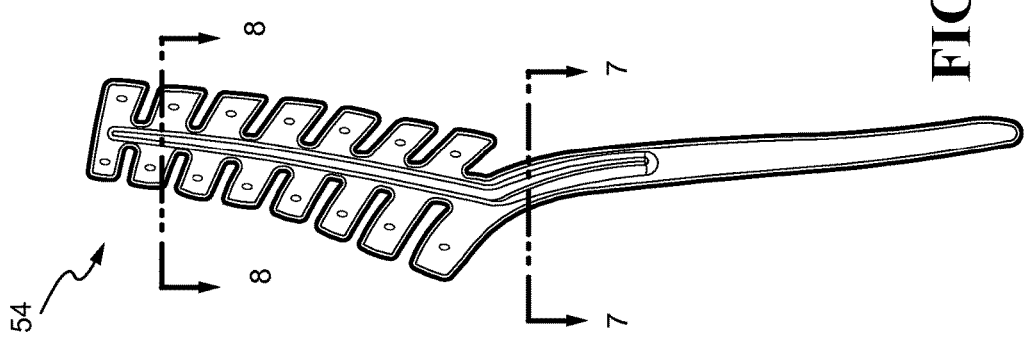
FIG. 6 is a side view of the filler of FIG. 5.

Referring now specifically to FIGS. 7 and 8, it can be seen that the filler 54 may comprise a preloaded spring 56. The preloaded spring 56 may exert a force within the pocket 52 for the dual purpose of resisting flutter of the airfoil 40 and damping vibratory response of the airfoil 40. A predetermined load on the spring 56 may be configured to change an inherent frequency of the airfoil 40 and resist side-to-side, tip, and torsional movement of the airfoil 40. Although shown as including only one spring 56, the filler 54 may include more than one spring.

Figure 9:
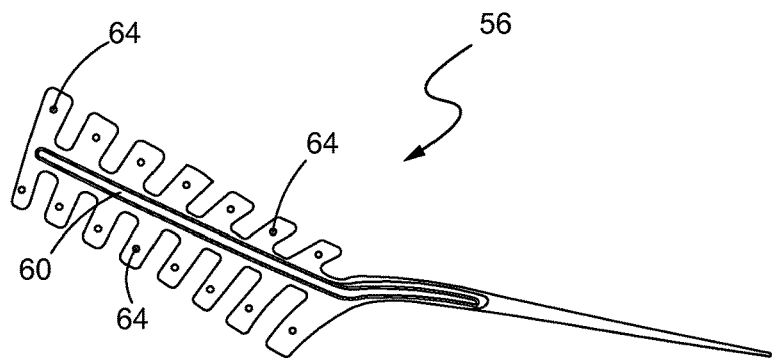
FIG. 9 is a perspective views of a spring of the filler of FIG. 6.
Figure 10:
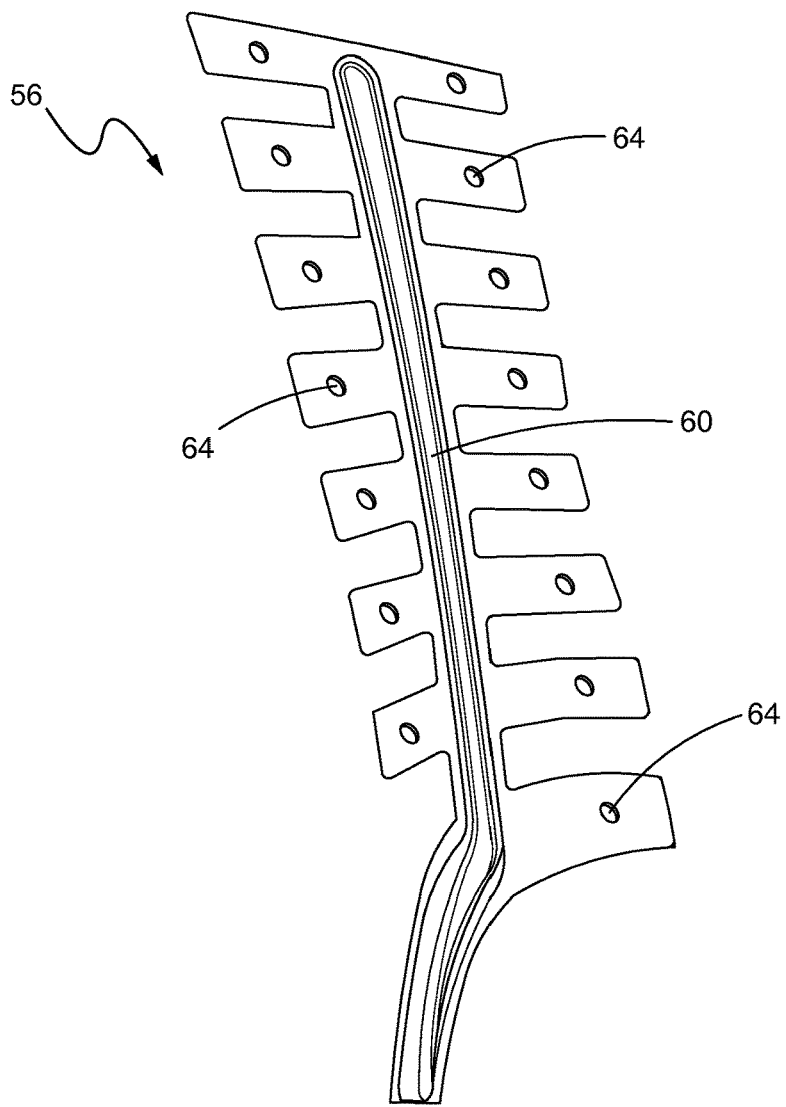
FIG. 10 is a side view of a part of the spring of FIG. 9.

The preloaded spring 56 may be composed of spring steel or the like. For example, a contour of the spring 56 may be cut from a sheet of spring steel, with the contour of the spring 56 having a similar outline or contour as the pocket 52 of the airfoil 40, as shown in FIGS. 9 and 10. A thickness, composition, stiffness, and/or heat treatment of the spring 56 may be configured to change the inherent frequency of the airfoil 40 to a predetermined frequency outside a range of resonant frequencies of the airfoil 40. It is to be understood that the shape and design of the spring 56, shown in FIGS. 9 and 10, is merely exemplary and other shapes/designs are certainly possible.

Figure 11:
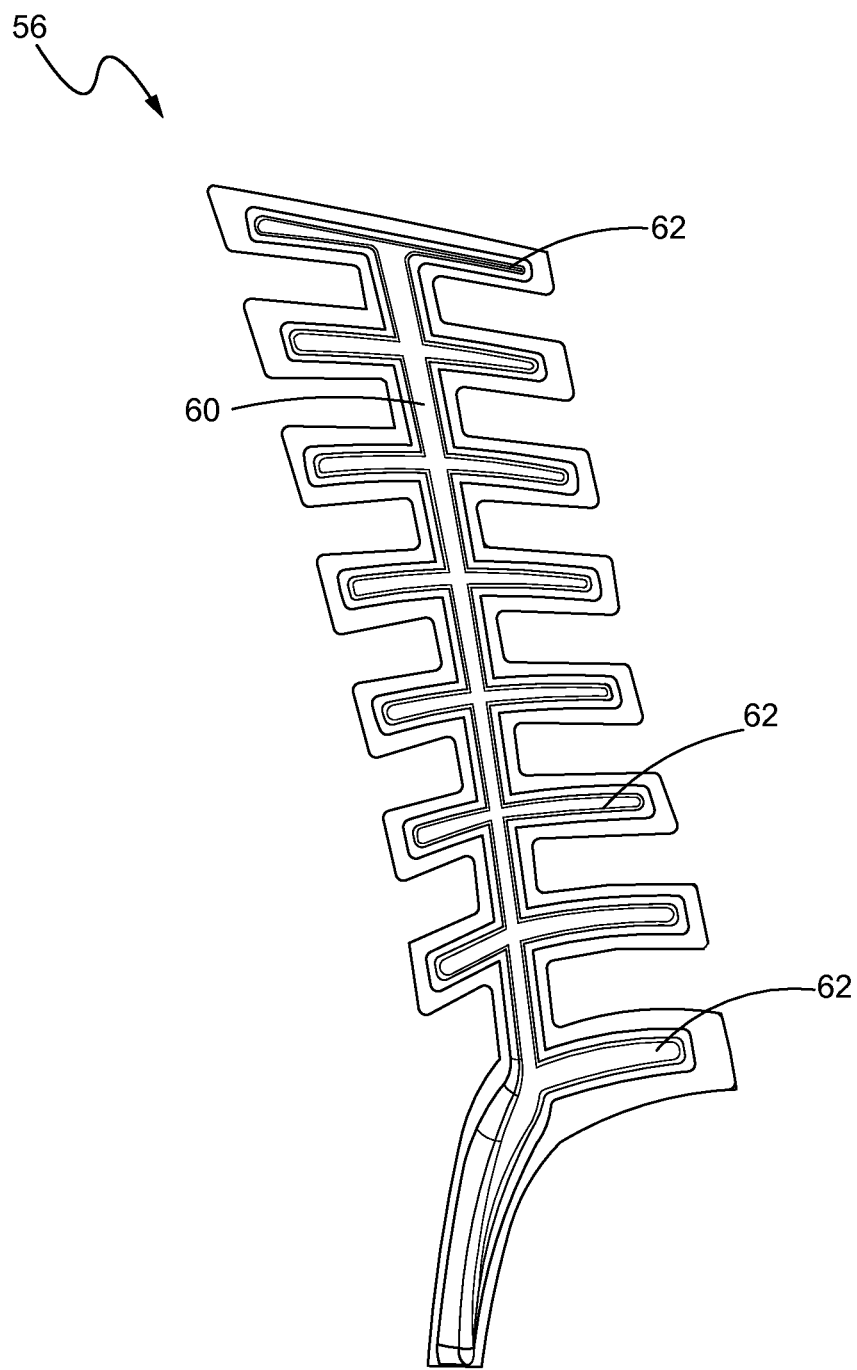
FIG. 11 is a side view of a spring, according to another embodiment of the present disclosure.

The spring 56 may include at least one gusset 60 to increase the stiffness of the spring 56. The gusset 60 may run along a central longitudinal axis of the spring 56 for strength and reinforcement. The structure of the gusset 60 may also be configured to alter the damping effect of spring 56 on the airfoil 40. For example, a width, depth, radius, material thickness, and/or heat treatment of the gusset 60 may be configured to change the inherent frequency and stiffness of the airfoil 40. In another embodiment, shown in FIG. 11, additional gussets 62 may be placed along lateral axes of the spring 56 for increased stiffness, strength and reinforcement. It is to be understood that placement and configuration of the gussets 60, 62 in FIGS. 9-11 are for exemplary purposes only, and other arrangements for the gussets are certainly possible.

The preloaded spring 56 may be embedded within a layer 58 of elastomeric material, or other suitable materials and compositions. For example, the layer 58 may be molded around the preloaded spring 56 (via co-molding, injection molding, or the like) to fit within and fill the pocket 52 of the airfoil 40. The layer 58 may surround and encapsulate the preloaded spring 56 in order to add dampening characteristics to the airfoil 40, prevent decompression of the preloaded spring 56, and impart the force exerted from the preloaded spring 56 to the pocket 52 of the airfoil 40. The layer 58 may also be used to prevent contact of the preloaded spring 56 with the pocket 52 of the airfoil 40. A composition, thickness, durometer, and/or density of the layer 58 may be configured to change the inherent frequency of the airfoil 40.

In addition, the preloaded spring 56 may have at least one hole 64 to facilitate the attachment of the preloaded spring 56 to the filler 54. For example, the layer 58 of elastomeric material may form through the at least one hole 64 of the spring 56, thereby securing the spring 56 within the layer 58 of elastomeric material. It is to be understood that the number and configuration of holes 64 in the spring, shown in FIGS. 9-11, are merely exemplary and that different arrangements (or no holes at all) may be provided in the spring 56, without departing from the scope of the disclosure.

Figure 12:
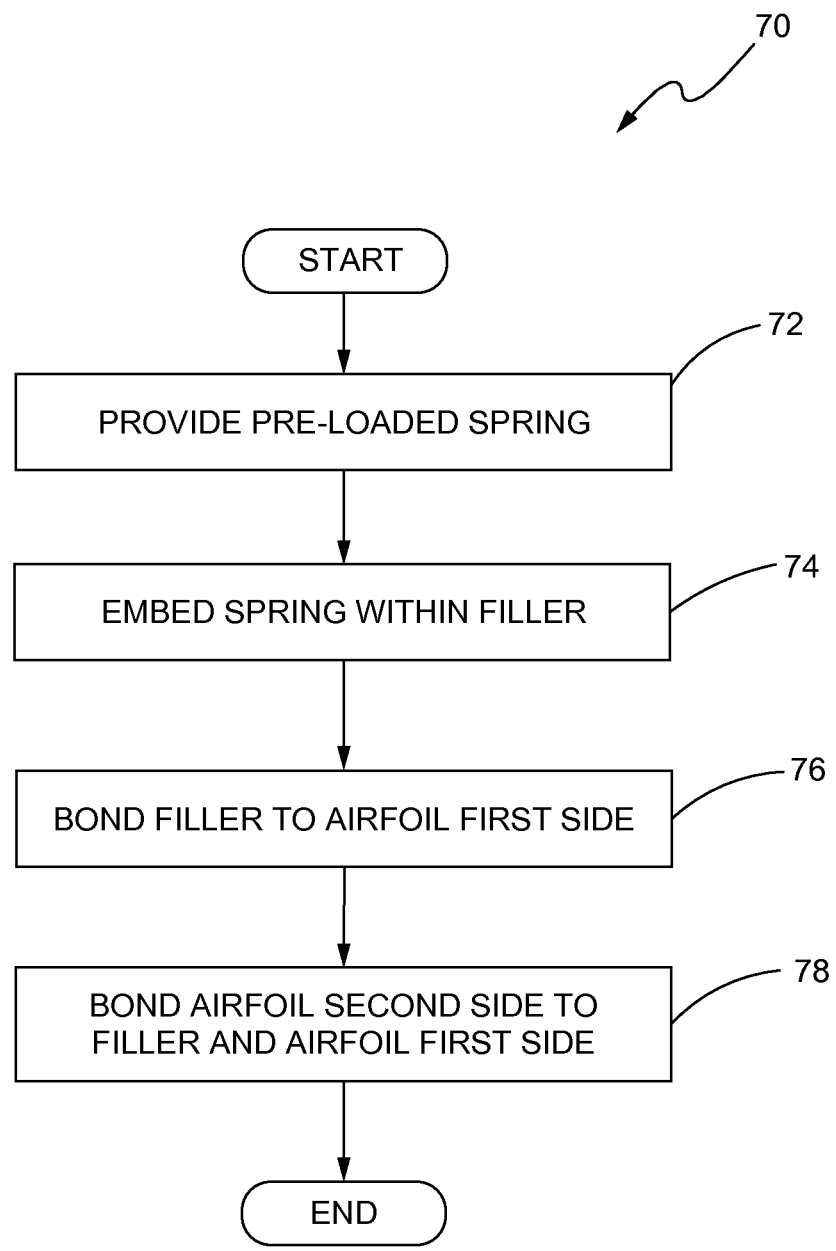
FIG. 12 is a flowchart outlining a method for manufacturing the airfoil of FIG. 2, according to yet another embodiment of the present disclosure.

Turning now to FIG. 12, a flowchart outlining a method 70 for manufacturing the airfoil 40 of the gas turbine engine is shown, according to another exemplary embodiment of the present disclosure. At a first step 72 of the method 70, the spring 56 with a predetermined load may be provided. For example, the pre-loaded spring 56 may be cut, such as by a laser, from the sheet of spring steel to correspond to the contour of the pocket 52, the at least one hole 64 may be cut (such as by a laser) into the spring 56, and the at least one gusset 60 may be formed in the spring 56 (such as via a forming dye). Next, at a step 74, the pre-loaded spring 56 is embedded within the filler 54. For example, a layer of elastomeric material may be molded around the pre-loaded spring 56 to fill the pocket 52 of the first side 42 of the airfoil 40. At a next step 76, the filler 54 is bonded, such as via an adhesive, to the pocket 52 of the first side 42 of the airfoil 40. Lastly, at a final step 78, the second side 44 of the airfoil 40 is bonded to the filler 54 and the first side 42 of the airfoil 40 to enclose the filler 54 and complete an aerodynamic surface of the airfoil 40.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a dampened airfoil for a gas turbine engine and a method of manufacture. The disclosed filler for the airfoil includes a preloaded spring and elastomeric layer surrounding the spring, both of which may be configured to tune the inherent frequency of the airfoil to a desirable frequency, outside the range of vibratory excitations that may lead to failure or fatigue. Furthermore, the disclosed spring within the filler provides force or tension within the airfoil, thereby creating resistance to flutter or side-to-side, tip, and torsional movement. The preloaded spring and elastomeric layer, which together form the filler, results in a stiffer, stronger, and longer-lasting airfoil design, which may thereby extend engine life, reduce maintenance costs, and improve aircraft safety.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, but rather includes all embodiments and equivalents encompassed within the claims appended hereto as well.

What is claimed is:

1. An airfoil for a gas turbine engine, comprising:
   a first side extending axially from a leading edge to a trailing edge and extending radially from a base to a tip;
   a second side opposite to the first side;
   a pocket disposed in the first side;
   a filler with a preloaded spring disposed therein and disposed in the pocket, wherein the preloaded spring is embedded in the filler when the filler is being disposed in the pocket, wherein the preloaded spring exerts a force within the pocket for resisting flutter of the airfoil and for damping vibratory response of the airfoil.

2. The airfoil of claim 1, wherein the filler surrounds and encapsulates the preloaded spring, and is formed to fill the pocket.

3. The airfoil of claim 2, wherein the filler dampens a vibratory response of the airfoil, prevents decompression of the preloaded spring, imparts force exerted from the preloaded spring to the airfoil, and prevents contact of the preloaded spring with the pocket.

4. The airfoil of claim 1, wherein the filler is bonded to the pocket of the first side, and the second side is bonded to the first side and the filler.

5. The airfoil of claim 1, wherein the preloaded spring and the filler are configured to change an inherent frequency of the airfoil to a predetermined frequency outside a range of resonant frequencies of the airfoil.

6. The airfoil of claim 5, wherein at least one of a composition of the filler, thickness of the filler, durometer of the filler, thickness of the preloaded spring, preload of the preloaded spring, stiffness of the preloaded spring, and heat treatment of the preloaded spring is configured to change the inherent frequency of the fan blade to the predetermined frequency.

7. The airfoil of claim 1, wherein the preloaded spring includes at least one gusset for increasing stiffness of the preloaded spring.

8. The airfoil of claim 7, wherein at least one of a width, depth, radii, thickness, and heat treatment of the at least one gusset is configured to change the inherent frequency of the airfoil to a predetermined frequency outside a range of resonant frequencies of the airfoil.

9. The airfoil of claim 1, wherein the preloaded spring includes at least one hole to allow attachment of the filler to the preloaded spring.

10. The airfoil of claim 1, wherein the preloaded spring is composed of a sheet of spring steel having an outline similar to an outline of the pocket.

11. The airfoil of claim 1, wherein the filler is composed of an elastomeric material.

12. A method for manufacturing an airfoil of a gas turbine engine, comprising:
    providing a spring with a predetermined load;
    embedding the spring within a filler;
    bonding the filler to a cavity of a first side of the airfoil;
    bonding a second side of the airfoil to the filler and the first side of the airfoil, wherein the spring is embedded in the filler prior to the bonding steps; and wherein the spring exerts a force within the cavity to resist flutter of the airfoil and to dampen a vibratory response of the airfoil.

13. The method of claim 12, further comprising configuring at least one of the predetermined load of the spring, thickness of the spring, stiffness of the spring, heat treatment of the spring, composition of the filler, thickness of the filler, and durometer of the filler, to dampen a frequency of the airfoil and reduce risk of high and low cycle fatigue.

14. The method of claim 12, further comprising cutting a contour of the spring from a sheet of spring steel to correspond to a contour of the cavity.

15. The method of claim 14, further comprising providing holes in the spring to allow molding of the filler therethrough.

16. The method of claim 12, further comprising forming at least one gusset in the spring.

17. The method of claim 12, further comprising molding the filler to fill the cavity of the first side of the airfoil.

* * * * *